United States Patent
Rooke

[19]

[11] Patent Number: 6,016,842
[45] Date of Patent: Jan. 25, 2000

[54] END FITTINGS FOR METAL HOSE ASSEMBLIES AND METHOD OF ATTACHMENT

[75] Inventor: Gregory P. Rooke, Springfield, Mass.

[73] Assignee: Titeflex Corporation, Springfield, Mass.

[21] Appl. No.: 08/587,916

[22] Filed: Jan. 17, 1996

[51] Int. Cl.[7] .................................................. F16L 9/00
[52] U.S. Cl. ........................ 138/109; 138/121; 138/120; 285/289.1; 285/256
[58] Field of Search .................................. 138/109, 124, 138/121, 120, 155; 285/222.5, 256, 289.1, 226

[56] References Cited

U.S. PATENT DOCUMENTS

| | | | |
|---|---|---|---|
| 762,954 | 6/1904 | Smith | 138/124 |
| 1,314,867 | 9/1919 | Gray | 138/124 X |
| 1,774,983 | 9/1930 | Loughead | 138/131 |
| 1,824,499 | 9/1931 | Reichenbecher | 138/109 X |
| 1,836,822 | 12/1931 | Sneed | 464/171 |
| 1,928,910 | 10/1933 | Riemenschneider | 138/109 X |
| 2,066,473 | 1/1937 | Jorgensen | 285/237 |
| 2,473,879 | 6/1949 | Guarnaschelli | 285/222.5 |
| 2,722,437 | 11/1955 | Phillips | 285/222.5 |
| 2,800,145 | 7/1957 | Peierls et al. | 285/256 |
| 3,557,275 | 1/1971 | Longshaw et al. | 138/109 X |
| 4,073,512 | 2/1978 | Vian et al. | 138/109 X |
| 4,114,656 | 9/1978 | Kish | 138/109 |
| 5,069,253 | 12/1991 | Hadley | 138/109 |
| 5,263,747 | 11/1993 | Lefebvre et al. | 285/226 |
| 5,297,586 | 3/1994 | McIntosh | 138/109 |
| 5,358,012 | 10/1994 | Kish | 138/109 |

*Primary Examiner*—Patrick Brinson
*Attorney, Agent, or Firm*—Donald S. Holland, Esq.; Holland & Bonzagni, PC

[57] ABSTRACT

End fittings for metal hose assemblies are disclosed, plus a method for their attachment. In a preferred embodiment, the hose assembly comprises: a standard flexible metal hose with a convoluted metal innercore; two cold-worked tubular end fittings with straight end portions that are inserted into opposite ends of the innercore, whereby stop beads on the tube limit the amounts of insertion and position the fittings; annular welds between crowns of the beads and adjacent flattened convolutions of the innercore that fix the fittings to the hose; and a pair of crimped locking collars or ferrules (carried on the fittings) that are mounted on the hose ends to protect the welds and hold the fittings in place. No prior machining of the inserted end portions of the fittings is needed to secure a stable weld.

9 Claims, 1 Drawing Sheet

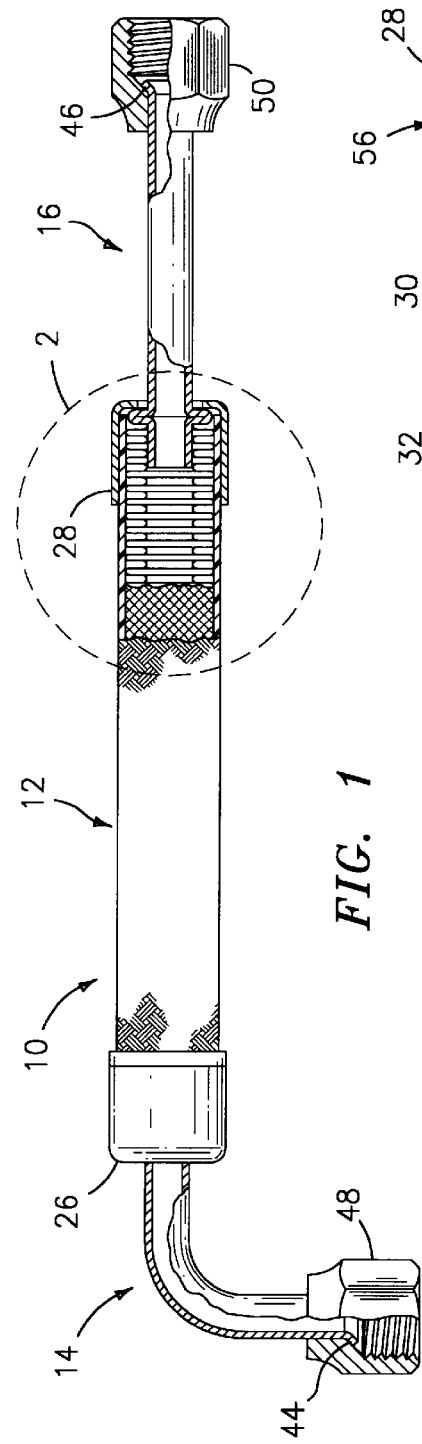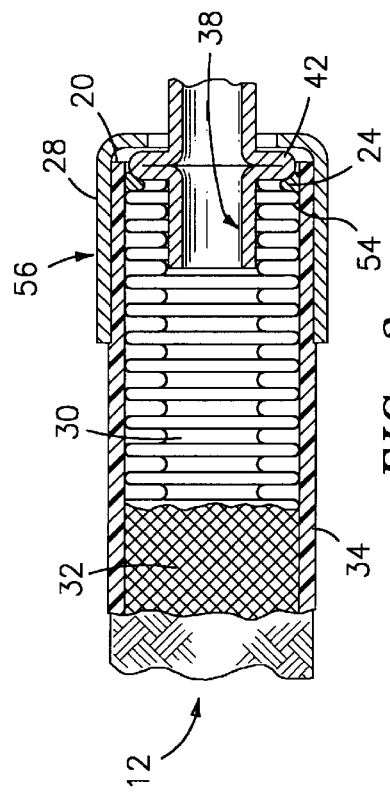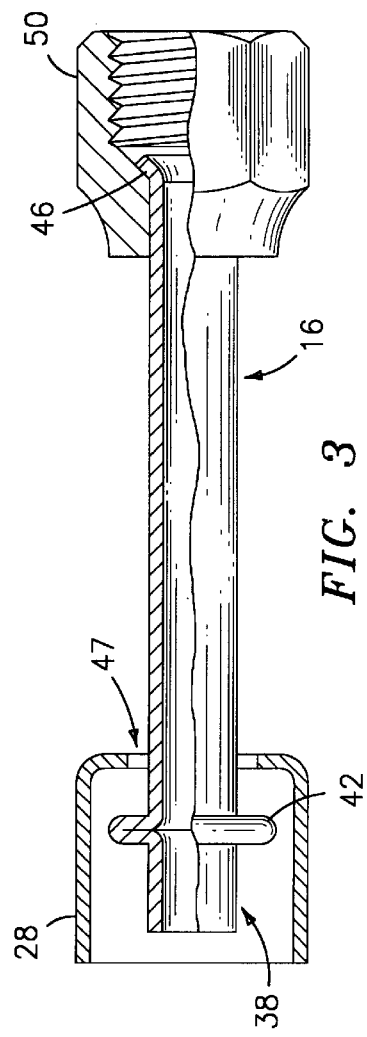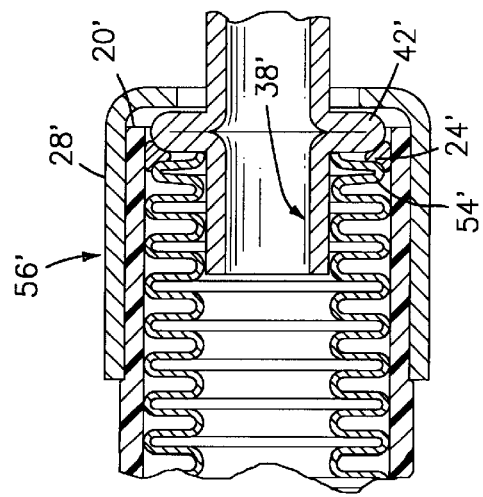

END FITTINGS FOR METAL HOSE ASSEMBLIES AND METHOD OF ATTACHMENT

BACKGROUND OF THE INVENTION

This invention relates to metal hose assemblies for conveying low- to medium-pressure fluids. More particularly, it relates to end fittings for flexible metal hoses used to carry refrigerants or coolants.

Flexible metal hoses typically have an innercore or convoluted tube made of copper, brass, bronze, steel or the like. The innercore has fluted convolutions, which render it readily flexible in axial planes. The core is covered with a reinforcing layer of braided metal wire to protect the assembly from injury upon contact with other objects, to prevent foreign matter from becoming lodged between the convolutions, and to improve its pressure capability and appearance. An optional plastic jacket is sometimes used over the braid for added abrasion protection, ease in cleaning, and/or appearance (permits color and labelling).

Both ends of the hose have attached fittings to removably connect the assembly to fluid reservoirs, machines or lines. The attachment of such fittings has often been accomplished by soldering and brazing. For those processes, the fitting usually has a cup-shaped cavity to receive an end of the hose; and solder or braze material is deposited in the cup to form a bond between the fitting and the hose when the fitting is inserted in the cavity. Certain difficulties occur in soldering such a fitting to the end of a flexible metal hose. When the flexible hose is initially cut to size, the wire braid tends to unravel and expand at the severed end, rendering the hose exceedingly difficult to insert in the cavity of a fitting. Sometimes, the braid is pushed back during insertion of the fitting such that no bond (or an inadequate bond) is formed between the fitting and the braid. It is therefore necessary to squeeze and hold the braid together prior to such insertions, presenting considerable inconvenience and causing loss of time in the manipulation.

Welding, as opposed to soldering, is sometimes used to attach end fittings to flexible hose assemblies. It provides a quick attachment, especially with modern techniques such as computerized electric-arc welding. The end fitting, however, has to be machined or sized to achieve the geometry required to make a stable welded connection to the metal innercore. This machining drives up assembly costs.

It is, therefore, the primary object of the present invention to provide a unique end fitting, for flexible metal hose assemblies, which overcomes the deficiencies of the prior art.

It is a general object to provide a flexible metal hose assembly wherein a unique metal fitting is firmly secured by welding and crimping, but without machining the fitting beforehand.

It is another object to produce such a fitting at low cost and high speed of manufacture, as compared to the machined end fittings traditionally used.

SUMMARY OF THE INVENTION

A flexible metal hose assembly is disclosed for use in low and medium pressure applications. In the preferred embodiment, the hose assembly comprises: a standard flexible metal hose with a convoluted metal innercore; two cold-worked tubular end fittings that are inserted into opposite ends of the innercore, whereby stop beads on the fittings limit the amounts of insertion and position the fittings; annular welds between the beads and adjacent convolutions of the innercore to fix the fittings to the hose; and a pair of crimped locking collars or ferrules over the hose ends, on the hose's plastic jacket. The locking collars surround the stop beads to protect the welds and hold the fittings in place.

The above and other objects and advantages of this invention will become more readily apparent when the following description is read in conjunction with the accompanying drawings.

BRIEF DESCRIPTION OF THE DRAWINGS

FIG. 1 shows a preferred embodiment of a flexible metal hose assembly constructed in accordance with the present invention, with portions broken away;

FIG. 2 is an enlargement of an encircled end portion in FIG. 1, showing the unique attachment of an end fitting to the hose assembly;

FIG. 3 is an enlarged view of a straight end fitting found in FIG. 1, prior to it becoming attached to the hose assembly; and FIG. 4 shows a n alternate embodiment of the present invention.

DETAILED DESCRIPTION OF THE PREFERRED EMBODIMENT

Referring to FIGS. 1–3 of the drawings, a unique metal hose assembly is shown and generally designated by the reference numeral 10. In this preferred embodiment, the metal hose assembly 10 comprises: a standard flexible metal hose 12; and two beaded tube fittings 14, 16 that are attached to opposite ends (for example 20) of the hose 12 by welds (for example 24) and crimped ferrules 26, 28 (carried on the fittings).

The illustrated hose 12 includes a convoluted innercore 30, made of steel or alloys thereof; a steel braid 32 around the core; and an extruded polyethylene jacket 34. Though Applicant has displayed his best mode of manufacturing the invention, other hose configurations and materials should work equally as well. The reader should note that it is not the hose 12, but rather the end fittings 14, 16 and/or their manner of attachment to the hose, that form the crux of this invention.

Referring to FIGS. 1 and 3, the illustrated end fittings 14, 16 are of two exemplary types: fitting 14 is basically a straight tubular insert, while fitting 16 is an elbow insert with a 90° bend. Both fittings have straight end portions (for example 38) that are hollow right cylinders. Stop beads (for example 42) define the boundaries of these end portions.

Fittings 14, 16 have flared end portions 44, 46 opposite their straight end portions (for example 38). The flares are sloped sufficiently (here, 45°) to hold brass hex 35 nuts 48, 50, and allow them to freely turn.

The illustrated end fittings 14, 16 are formed by cold-working the bodies of straight tubes (not shown), after they have been cut to desired lengths. This process forms the flared ends 44, 46 and the beads (for example 42).

The ferrules 26, 28 are also held on the fittings 14, 16, between the stop beads (for example 42) and flared ends 44,46 (see FIG. 3). These ferrules are designed to act as locking collars for the hose assembly 10. They are cylindrical cups with central holes or throughbores (for example 47) in their bottoms. They are slipped onto the tube fittings 14, 16 after the beads (for example 42) are formed. The flared end portions 44, 46 are then made, which capture the ferrules.

To attach the fittings 14, 16 to the flexible metal hose 12, the straight end portions (for example 38) are first inserted into hose ends (for example 20) until the beads (for example 42) abut the innercore 30.

Welds (for example 24) are then formed between the beads (for example 42) and the initial flutes (for example 54) of the convoluted core 30. They are formed by any suitable method, such as orbital welding without any filler material.

Next, the ferrules 26, 28 are moved over, until their bottoms touch the stop beads (for example 42). Once there, the ferrules straddle the hose ends (for example 20), and extend over the fittings' end portions (for example 38). The ferrules are then radially crimped at 54, 56 (preferably over their entire bodies) until the hose's plastic outer jacket 34 is breached and/or the metal braid is coined inside the ferrules (not shown). The ferrules act not only as locking collars, but also as protection for the underlying welds (for example 24).

FIG. 4 shows another preferred embodiment of the joints between the end fittings and hose. In this drawing figure, common parts with FIG. 1–3 have been labelled with the same reference numbers, but with primes after them.

The FIG. 4 embodiment permits better intimacy between the two parts where each weld is made. To achieve this, the initial convolutions (for example 54') of the metal innercore 30' are flattened prior to insertion of the fittings (for example 16'). The braid 32' and plastic jacket 34' are doubled back onto the innercore, away from the desired weld location; the weld (for example 24') is made between the crowns of the beads and initial convolutions; and then the braid, with jacket, is replaced over the weld, abutting the shoulders of the ferrule (for example 28').

The embodiment shown in FIG. 4 is being marketed by the assignee of this invention, the Titeflex Corporation of Springfield, Mass. It is being sold under the trademark "GREEN-SAFE".

It should be understood by those skilled in the art that obvious structural modifications can be made without departing from the spirit of the invention. For example, the locking collars 26, 28 could be crimped at portions, rather than over their entire lengths; or the orbital welds (for example 24) could even be overlapping spot welds, though that would not be the best way to proceed. Also, other fitting end treatments could be used—rather than the illustrated flared ends 44, 46 with swivel nuts 48, 50—to permit attachment of the "GREEN-SAFE" assembly to other equipment. Accordingly, reference should be made primarily to the accompanying claims, rather than the foregoing specification, to determine the scope of the invention.

What is claimed is:

1. A method of attaching a metal end fitting to a flexible metal hose comprising:
   a. sliding a ferrule with a throughbore onto a metal tube;
   b. cold-working the tube to produce an annular stop bead, along the tube's mid-length, that retains the ferrule between the bead and a flared end of the tube;
   c. inserting a straight end portion of the tube into a first end of a convoluted metal innercore of the flexible metal hose until the stop bead abuts the innercore;
   d. flattening a first convolution of the metal innercore to produce a crown, prior to inserting the tube into the innercore;
   e. connecting the metal stop bead to the metal innercore by a weld between the crown of the flattened first convolution and a tip of the stop bead, wherein the weld is located, at least in part, atop the crown;
   f. sliding the ferrule over the stop bead until it is mounted on the first end of the innercore, where it straddles both the bead and weld; and
   g. radially crimping the ferrule to hold the ferrule in place and protect the weld.

2. The method of claim 1 wherein no machining is needed for the straight end portion of the end fitting prior to the end fitting being inserted into the innercore or the weld taking place.

3. The method of claim 1 wherein the weld is orbital.

4. In a flexible metal hose assembly of the type having a convoluted metal tubular innercore with a reinforcing layer of braided metal wire, the improvement comprising:
   a. at least one metal tubular fitting having a first end inserted within an end of the innercore, wherein said fitting has a metal stop bead that abuts the innercore and limits insertion of the fitting into the innercore;
   b. a first convolution of the innercore having a flattened portion comprising a crown;
   c. a weld between the metal stop bead and the metal innercore, wherein the weld is located, at least in part, atop the crown; and
   d. a ferrule retained on the end fitting between the bead and a second end of the fitting, wherein the ferrule is mounted on the innercore end, surrounds the stop bead and weld, and is radially crimped to hold the fitting in place and protect the weld.

5. The metal hose assembly of claim 4 wherein the weld is located, at least in part, between a tip of the stop bead and the crown of the flattened first convolution of the innercore.

6. The metal hose assembly of claim 5 wherein the weld is substantially annular, around the fitting.

7. The metal hose assembly of claim 4 wherein the weld is formed without any filler material.

8. An apparatus comprising:
   a. a flexible metal hose having a convoluted metal innercore, with a flattened initial convolution, and a reinforcing layer of braided metal wire;
   b. a cold-worked metal tubular fitting comprising:
      i. a straight first end portion, terminated by an annular stop bead, and a second end portion;
      ii. a cup-shaped ferrule, slidably retained on the tubular end fitting, between the stop bead and the second end portion by a throughtout in the ferrule having a diameter greater than that of the fitting but less than the outer dimension of the stop bead; and
   c. wherein the straight end portion of the tubular fitting is inserted within an end of the innercore with the fitting's stop bead abutting the innercore, a substantially annular weld is located between the bead and a first convolution of the innercore, the ferrule is mounted on the innercore end where it encases the weld and bead, and the ferrule is radially crimped to hold the fitting in place and protect the weld; and
   d. wherein the weld, at least in part, straddles a crown of the flattened initial convolution.

9. The apparatus of claim 8, wherein the weld also straddles, at least in part, a tip of the stop bead.

* * * * *

UNITED STATES PATENT AND TRADEMARK OFFICE
CERTIFICATE OF CORRECTION

PATENT NO.  : 6,016,842
DATED       : JANUARY 25, 2000
INVENTOR(S) : GREGORY P. ROOKE

It is certified that error appears in the above-identified patent and that said Letters Patent is hereby corrected as shown below:

```
In the Claims, Column 4, line 49, change "throughtout"
to --throughbore--.
```

Signed and Sealed this

Third Day of October, 2000

Attest:

Q. TODD DICKINSON

*Attesting Officer*    *Director of Patents and Trademarks*